United States Patent [19]

Daniels

[11] 4,218,832
[45] Aug. 26, 1980

[54] APPARATUS FOR PROCESSING WOOD PRODUCTS USING HEAT FROM A BOILER FOR INDIRECTLY HEATING DRYING GAS

[75] Inventor: Vernon E. Daniels, Eugene, Oreg.

[73] Assignee: Champion International Corporation, Stamford, Conn.

[21] Appl. No.: 33,732

[22] Filed: Apr. 27, 1979

Related U.S. Application Data

[63] Continuation of Ser. No. 784,076, Apr. 4, 1977, abandoned.

[51] Int. Cl.² ............................ F26B 3/04; F26B 21/04
[52] U.S. Cl. ............................................ 34/79; 34/86; 55/222; 55/269; 165/DIG. 12
[58] Field of Search ..................... 34/35, 86, 79, 77; 55/267, 268, 269, 222; 162/47; 165/DIG. 12

[56] References Cited

U.S. PATENT DOCUMENTS

| 2,029,360 | 2/1936 | Dean | 162/47 |
|---|---|---|---|
| 2,174,185 | 9/1939 | Carter | 55/269 |
| 2,677,434 | 5/1954 | Hedberg et al. | 55/267 |
| 2,711,591 | 6/1955 | Wellmar | 34/86 |
| 3,623,235 | 11/1971 | Smith, Jr. | 34/86 |
| 3,800,429 | 4/1974 | Lindl | 34/79 |
| 4,008,056 | 2/1977 | Potter | 55/267 |
| 4,012,191 | 3/1977 | Lisankie et al. | 34/86 |
| 4,026,037 | 5/1977 | Buchholz | 34/77 |
| 4,083,398 | 4/1978 | Fallon, Jr. et al. | 165/DIG. 112 |

OTHER PUBLICATIONS

"Ross Fume Incinerators GF-900 Series with Heat Recovery", Ross Engineering Machinery Division Brochure; New Brunswick, N.J., 8-1973.

Primary Examiner—Richard V. Fisher
Assistant Examiner—Steve Alvo
Attorney, Agent, or Firm—Evelyn M. Sommer

[57] ABSTRACT

In an apparatus for making wood and/or paper products from raw wood, the exhaust gas from the boiler that is employed for generating steam is used to heat the drying gas that is passed through the dryer. An air-to-air heat exchanger is used to transfer the heat energy from the exhaust gas to the drying gas.

3 Claims, 2 Drawing Figures

APPARATUS FOR PROCESSING WOOD PRODUCTS USING HEAT FROM A BOILER FOR INDIRECTLY HEATING DRYING GAS

This is a continuation of application Ser. No. 784,076 filed Apr. 4, 1977, now abandoned.

BACKGROUND OF THE INVENTION

This invention relates to a method and apparatus for making wood and/or paper products from raw wood. More particularly, this invention relates to a novel arrangement for heating the drying gas that is passed through the dryer used in the course of making plywood veneer, particle board and other wood and/or paper products from raw wood.

Veneer is a thin sheet of wood of uniform thickness produced by peeling, slicing or sawing logs, bolts or flitches. Most wood species require steaming or heating before they can be cut into veneer. Veneer is used mainly to make plywood, a multilayered wood product in which the grains of adjacent layers are at right angles to each other. Before being made into plywood, veneer is usually dried to uniform moisture levels.

Particle board is a well known type of wood product consisting of wood fiber particles of varying sizes pressed or extruded as sheets and bound by a resin such as ureaformaldehyde. In the process of making particle board, the raw wood is usually steam heated and then dried to the necessary moisture levels. When faced with plywood, particle board is used extensively as a core material in furniture and cabinetwork and in the building industry for interior and exterior paneling.

In the processes for making veneer, particle board and other types of wood and/or paper products, the steam needed for treating the wood is obtained from a boiler and the drying of the wood is normally done in a dryer in which a drying gas, usually air, heated to a temperature of above 200° F. (about 400° F. for veneer, about 800° F. for particles, and about 600° F. for fibre) by a gas or oil burner, is passed over the wood and carries away from the wood vaporized liquid. The fuel needed for the burner used to heat the drying gas to the proper temperature increases the overall cost of the final product. Furthermore, the combustion gases produced in burning the fuel for heating the drying gas are a source of pollution.

SUMMARY OF THE INVENTION

It is an object of this invention to provide a new and improved method and apparatus for making veneer, particle board and other wood and/or paper products from raw wood.

It is another object of this invention to provide a novel arrangement for heating the drying gas that is passed through the dryer used in making plywood veneer and/or particle board from raw wood.

It is still another object of this invention to provide a technique for using the exhaust gas from a boiler to heat the drying gas in a dryer.

It is yet still another object of this invention to reduce the pollution produced from combustion gases in the course of processing wood products from raw wood.

It is another object of this invention to provide a technique for converting exhaust gases from a boiler into useful heat energy and making use of the heat energy so obtained.

It is still another object of this invention to provide an arrangement for recovering useful fuel from boiler exhaust gases.

It is another object of this invention to provide a technique for eliminating the need for a burner to heat the drying gas that is passed through a dryer used in making wood products from raw wood.

This invention is based on the idea of using the heat energy in the exhaust gas from the boiler used to generate steam to heat the drying gas that is passed through the dryers. The idea is centered around the use of an air-to-air heat exchanger as the mechanism for transferring the heat energy from the boiler exhaust gas to the drying gas.

According to this invention, spent gas from a boiler used in generating steam for processing wood and/or supplying power for operating the cutting saws is passed through a dry collector to cleanse it of collectible fly-ash and cinders. The cinders are directed back to the boiler and used as fuel. The cleaned gas is then routed to one side of an air-to-air heat exchanger where it delivers its heat energy in heat exchange. The spent cooled gas is then directed into a scrubbing machine where objectionable residual particles which might be present are removed and is then discharged to the atmosphere. Air on the other side of the heat exchanger, which is thus heated, is passed through a dryer where it picks up vaporized liquid as it is cooled.

One advantage of the invention is that it displaces a natural gas need (for the dryer burners) with energy (from the boiler stack gases) that is otherwise totally wasted. Another advantage is that it eliminates the need for burners for the dryers. Still another advantage is that the overall pollution is reduced since no additional combustion gases are produced in the course of heating the drying gas for the dryer. Still another advantage of the invention is that it results in the building up of a high humidity in the drying gas which is less able to support flames and causes fires and/or explosions.

The foregoing and other objects and advantages will appear from the description to follow. In the description, reference is made to the accompanying drawing which forms a part thereof, and in which is shown by way of illustration a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described by way of example, with reference to the drawings wherein.

DETAILED DESCRIPTION OF THE PREFERRED EMBODIMENT

Figure 1:
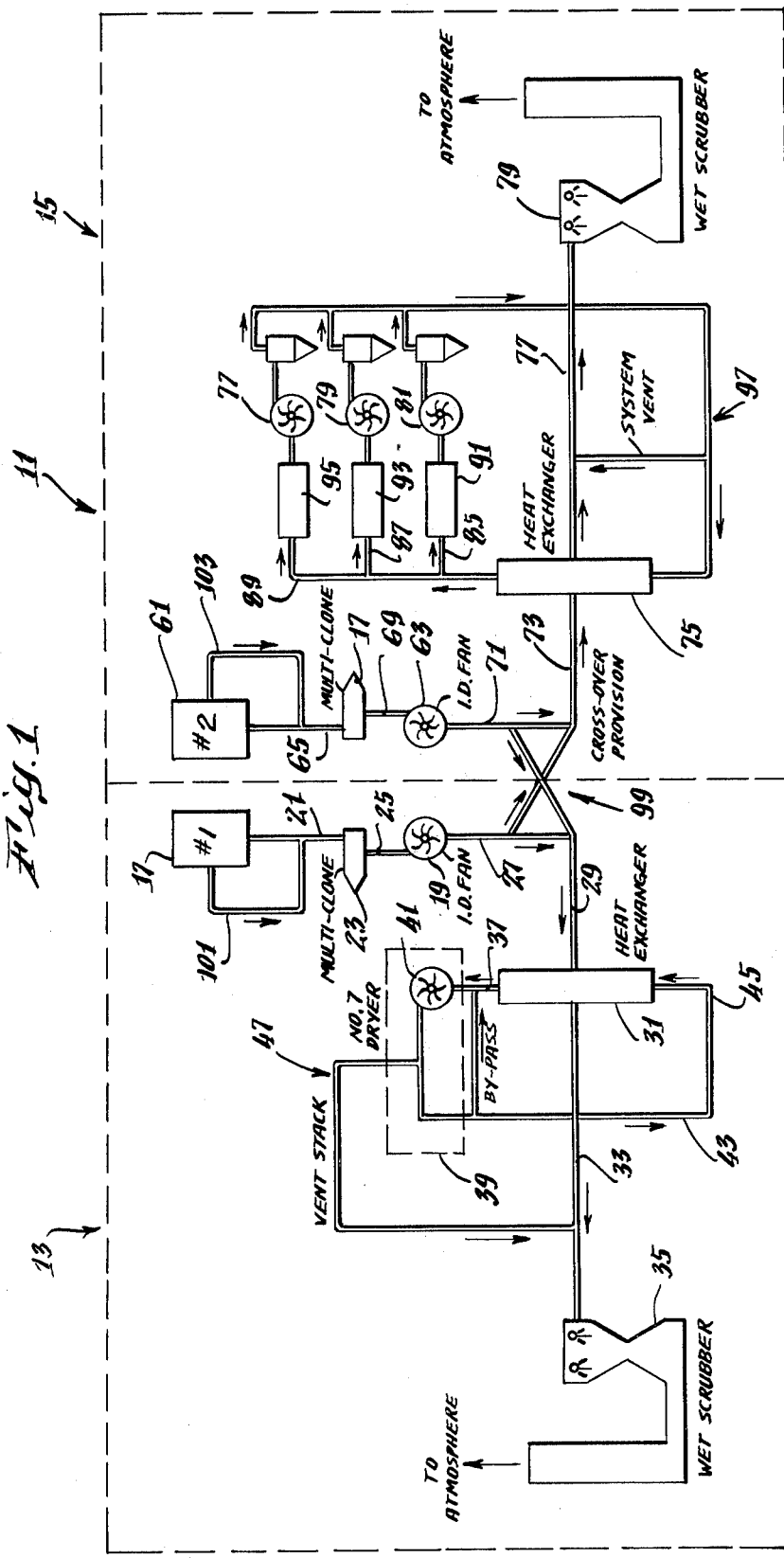
FIG. 1 is a schematic representation of an embodiment of the present invention for use in making plywood and particle board from raw wood.

Referring now to the drawing, there is shown in FIG. 1 an apparatus constructed according to this invention and identified by reference numeral 11. The apparatus 11 includes a section 13 for use in the process of making plywood veneer and a section 15 for use in the process of making wood fiber particle board. Except for the optional cross-over provision which will be explained in detail later, the two sections are essentially independent from each other. Also, it is to be understood that the apparatus shown in the drawing and described hereinafter in detail does not constitute a complete apparatus for processing raw wood to the desired product, but rather, only those portions of the apparatus pertinent to the invention.

Section 13 includes a boiler 17 for generating steam that is used in the process of making plywood veneer from raw wood. Boiler 17 may be a water tube type boiler utilizing hogged wood and bark as fuel and having a capacity of 70,000 pounds per hour. Steam from boiler 17 is used for process heat needs such as the hot presses and for electrical generation. Spent gas from the exhaust stacks (not shown) of the boiler 17 is routed by a fan 19 through a duct 21 to a dry collector 23 where it is cleansed of collectible fly-ash and cinders. Collector 23 is preferably a multiclone type commercially available collector, such as the Zurn model MTSA with 9" angled tubes.

The cinders collected by the dry collector 23 are directed back to the boiler 17 through an injector type device (not shown) after being separated from the fly ash and sand by a vibrating screen unit and used as fuel. Clean gas from the dry collector 23 is routed through ducts 25 and 27 and 29 to one side of an air-to-air heat exchanger 31 where it delivers its heat energy in heat exchange. The spent cooled gas is then directed through a duct 33 to a medium pressure drop contact wet scrubber 35 where any objectionable residual particulate is removed. Scrubber 35 is a typical medium pressure drop direct contact scrubber that is commercially available from any number of manufacturers such as Bumstod Woolford Company. Gas emerging from dryer 35 is discharged to the atmosphere.

Air on the other side of the air-to-air heat exchanger 31 is routed via a duct 37 through a plywood veneer dryer 39 by means of a fan 41 located at the dryer 39. Cooled air emerging from the dryer 39 is then directed back through ducts 43 and 45 to the heat exchanger 31 for reheating. A vent 47 is provided to allow about 10% of the drying gas to escape the closed loop between the heat exchanger 31 and the dryer 39 and carry off the water vapor removed from the wood being dried inside the dryer 39. Vent 47 is a dampened type of vent in which flow of the gas is dependent in the internal pressure. A by-pass 48 is provided to divide the flow of drying gas emerging from the dryer 39 and subsequently remix with the gas from the heat exchanger 31 so as to control the temperature of the gas entering the dryer 39.

Section 15 for use in making wood fiber particle board includes steam generating boiler 61 which is similar to boiler 17. Spent gas from exhaust stacks (not shown) of boiler 61 is routed by a fan 63 through a duct 65 to a dry collector 67, similar to dry collector 23. Clean gas from dry collector 49 is routed through ducts 69, 71 and 73 to one side of an air-to-air heat exchanger 75 which is similar to air-to-air heat exchanger 31. Spent gas from heat exchanger 75 is directed via a duct 77 to a wet scrubber boiler and dryer unit 79 similar to unit 35. Gas emerging from the dryer unit 79 is discharged to the atmosphere. Air on the other side of the heat exchanger 75 is routed by fans 77, 79 and 81 through ducts 83, 85, 87 and 89 to a group of dryers 91, 93 and 95, such as rotary kiln type Heil dryers, and then back to the heat exchanger 75 for reheating. Section 15 also includes a vent 97 similar in function and structure to vent 41.

The apparatus 11 further includes a cross over arrangement of ducts 99 so that the exhaust gases from either boiler can be used with either section.

It has been found that temperatures from the boiler stacks are in the order of 650° F., that temperatures from the heat exchangers are in the order of 400° F. and that temperatures from the final scrubber are in the order of 220° F.

In order to control that the temperature available to the system is adequate to the needs, by-pass system 101 and 103 respectively may be added to the boilers 17 and 61 respectively to allow the hot gases from the combustion chamber to bypass the convection tubes of the boiler to elevate the temperature in the discharge duct from the boiler. Temperatures of up to 2000° F. are available from this source to enable trimming the 650° F. gas stream to cope with demand.

Figure 2:
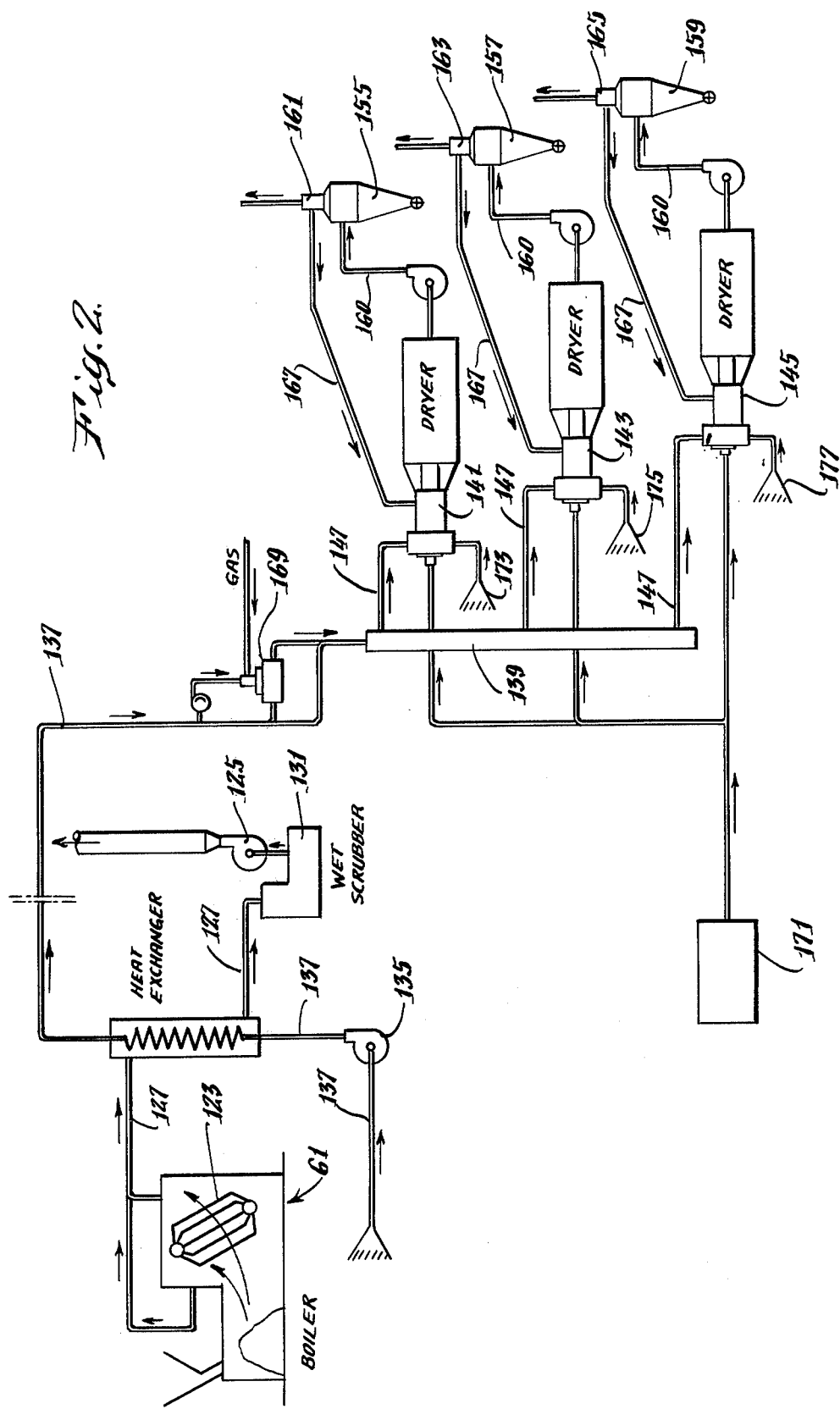
FIG. 2 is a schematic representation of a modification of the portion of the invention shown in FIG. 1 for making particle board.

In FIG. 2 there is shown a modified version of section 15.

In the FIG. 2 embodiment, exhaust gases from boiler 61, obtained either directly from the combustion chamber through opening 121, or, after having passed through the boiler convection tubes 123 if a lower temperature is desired, are routed by an induction draft fan 125 and ducts 127 through one side of a heat exchanger 129 and a wet scrubber 131 and then discharged to the atmosphere. Air from a source 133 is routed by a forced draft fan 135 through the other side of heat exchanger 129 via ducts 137 to a distributor 139 which is connected to dryers 141, 143, and 145 by means of ducts. The air is extracted from dryers 141, 143 and 145 by fans 149, 151 and 153 respectively, and fed into cyclone type separators 155, 157 and 159 respectively through ducts 160. A portion of the air (i.e. drying gas) fed into the separators 155, 157 and 159 is discharged to the atmosphere through openings 161, 163 and 165 respectively. The portion not discharged to the atmosphere is fed back into dryers 141, 143, 145 through ducts 167. A 5MMBTU/hr makeup burner 169 is coupled to duct 137 between the heat exchanger 129 and the distributor 139 to provide additional heat to the air passing from the heat exchanger 129 to the distributor 139, if needed. A source of standly gas (fuel) 171 is connected to the burners (not shown) located in each one of the dryers 141, 143 and 145, in the event it is necessary or desirable to use the burners in the dryers 141, 143 and 145 to heat the drying gas. A supply of air 173, 175 and 177 is connected to each one of the dryers 141, 143 and 145 respectively in case it is necessary or desirable to lower the temperature of the drying gas entering the dryers.

It will be understood that various changes in the details, materials, arrangements of parts and operating conditions which have been herein described and illustrated in order to explain the nature of the invention may be made by those skilled in the art within the principles and scope of the invention.

What is claimed is:

1. Apparatus for processing wood products, comprising:
- a boiler for use in processing wood products and including an exhaust outlet through which warm exhaust gases may leave said boiler;
- a gas-to-gas heat exchanger having a first inlet thereof flowably coupled with said exhaust outlet of said boiler for receiving said warm exhaust gases from said boiler, said heat exchanger further having a second inlet and a first outlet and operable to heat a drying gas passing into said heat exchanger through said second inlet and out of said heat exchanger through said first outlet using heat from said exhaust gases from said boiler, said heat exchanger having a second outlet through which said exhaust gases from said boiler may exit from said heat exchanger;
- drying means for receiving the drying gas from said heat exchanger and drying said wood products using said drying gas, said drying means including an inlet and an outlet therein through which said drying gas may pass, said drying inlet being flowably coupled with said first outlet of said heat exchanger, said outlet of said drying means carrying water vapor removed from said wood products and being flowably coupled with said second inlet of said heat exchanger;
- means operably coupled between said exhaust outlet of said boiler and said first inlet of said heat exchanger for cleaning said exhaust gases of fly ash and cinders; and
- vent means for carrying water vapor away from said drying means, said vent means being flowably coupled with said outlet of said drying means and with said second outlet of said heat exchanger for diverting a portion of the drying gas returning to said heat exchanger from said drying means and,
- a wet scrubber coupled with said second outlet of said heat exchanger, said vent means coupling said wet scrubber with said drying means, said scrubber being operable for removing residual particulate matter from the gases delivered thereto from said drying means and said heat exchanger.

2. The apparatus of claim 1, further including a cyclonic separator flowably coupled between said outlet and said inlet of said drying means.

3. The apparatus of claim 1, further including:
- a conduit flowably coupled between said first outlet of said heat exchanger and an intermediate section of said first dryer inlet to allow drying gas to recirculate through said heat exchanger and by-pass said drying means.

* * * * *